(12) United States Patent
Akatsuka

(10) Patent No.: US 11,220,257 B2
(45) Date of Patent: Jan. 11, 2022

(54) AUTONOMOUS PARKING CONTROL DEVICE AND AUTONOMOUS PARKING SYSTEM

(71) Applicant: TOYOTA JIDOSHA KABUSHIKI KAISHA, Toyota (JP)

(72) Inventor: Kosuke Akatsuka, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 407 days.

(21) Appl. No.: 16/426,154

(22) Filed: May 30, 2019

(65) Prior Publication Data

US 2020/0031336 A1  Jan. 30, 2020

(51) Int. Cl.
*B60W 30/06* (2006.01)
*G05D 1/00* (2006.01)
(Continued)

(52) U.S. Cl.
CPC ............ *B60W 30/06* (2013.01); *B60W 10/04* (2013.01); *B60W 10/18* (2013.01); *B60W 50/00* (2013.01);
(Continued)

(58) Field of Classification Search
CPC ...... B60W 30/06; B60W 10/04; B60W 10/18; B60W 50/00; B60W 2556/00; B60W 2710/18; B60W 2050/0008; B60W 2050/0012; B60W 2710/06; B60W 2710/08; B60W 2400/00; B60W 2554/60; B60W 2050/001; B60W 2520/10; B60W 2520/105; B60W 2720/10;
(Continued)

(56) References Cited

U.S. PATENT DOCUMENTS

| 10,343,631 | B2 * | 7/2019 | Poeppel | B62D 15/0285 |
| 2007/0129879 | A1 * | 6/2007 | Fedora | B64G 1/36 |
| | | | | 701/532 |

(Continued)

FOREIGN PATENT DOCUMENTS

| CN | 107284444 A | 10/2017 |
| CN | 107848501 A | 3/2018 |

(Continued)

*Primary Examiner* — Frederick M Brushaber
(74) *Attorney, Agent, or Firm* — Sughrue Mion, PLLC

(57) ABSTRACT

An autonomous parking control device executes vehicle traveling control that calculates a command value of a propulsive force based on an operating state, and moves the vehicle to a target position autonomously by controlling a propulsive force generating device in accordance with the command value. The control device executes an additional command value varying process of adding a predetermined additional command value to the command value when the vehicle stops due to the propulsive force being insufficient during the vehicle traveling control, and decreasing or keeping the additional command value by a predetermined degree of suppression, when the vehicle which is stopped is started. Here, when executing the additional command value varying process in the first position far from the target position, the degree of suppression is set to be smaller as compared with a case of executing the process in a second position close to the target position.

7 Claims, 12 Drawing Sheets

(51) Int. Cl.
*B60W 10/04* (2006.01)
*B60W 10/18* (2012.01)
*B60W 50/00* (2006.01)

(52) U.S. Cl.
CPC ... *G05D 1/0088* (2013.01); *B60W 2050/0008* (2013.01); *B60W 2050/0012* (2013.01); *B60W 2400/00* (2013.01); *B60W 2556/00* (2020.02); *B60W 2710/06* (2013.01); *B60W 2710/08* (2013.01); *B60W 2710/18* (2013.01)

(58) Field of Classification Search
CPC ....... B60W 2720/106; B60W 2554/20; B60W 2520/28; G05D 1/0088; B60T 7/12
See application file for complete search history.

(56) References Cited

U.S. PATENT DOCUMENTS

| | | | | |
|---|---|---|---|---|
| 2017/0291601 | A1* | 10/2017 | Kim | B60W 30/06 |
| 2018/0201239 | A1* | 7/2018 | Nakagawa | B60T 8/3255 |
| 2020/0024090 | A1* | 1/2020 | Mushynski | G08B 21/02 |
| 2020/0180459 | A1* | 6/2020 | Nagata | B60L 53/38 |
| 2021/0046920 | A1* | 2/2021 | Iwamitsu | B60W 10/06 |

FOREIGN PATENT DOCUMENTS

| | | |
|---|---|---|
| JP | 2013-049389 A | 3/2013 |
| JP | 2014-91351 A | 5/2014 |

\* cited by examiner

AUTONOMOUS PARKING CONTROL DEVICE AND AUTONOMOUS PARKING SYSTEM

CROSS-REFERENCE TO RELATED APPLICATION

The present disclosure claims priority under 35 U.S.C. § 119 to Japanese Patent Applications No. 2018-139157, filed on Jul. 25, 2018. The contents of these applications are incorporated herein by reference in their entirety.

FIELD

The present disclosure relates to an autonomous parking control device and an autonomous parking system for parking a vehicle autonomously.

BACKGROUND

JP 2013-049389 A discloses an art relating to driving force control for guiding a vehicle to a target position. The art is configured such that when a driving force command value is increased when the vehicle passes a level difference, and lifting of the wheel contacting the level difference is determined, increase in the driving force command value is suppressed so that a command value corresponding to an additional driving force becomes small. Thereby, even when the vehicle needs to be stopped at a position where the vehicle just passes through the level difference, it becomes possible to prevent an abrupt speed change from occurring.

SUMMARY

Incidentally, an unknown disturbance which may not be observed may hinder the progress of a vehicle. As the unknown disturbance like this, a steady-state disturbance such as a sensor error is also conceivable besides a transitional disturbance such as a level difference. As for the steady-state disturbance, for example, the case where the propulsive force of a vehicle becomes insufficient by erroneously recognizing a road surface gradient as gentler due to a steady-state error of a sensor or the like is illustrated. When the progress of the vehicle is hindered by an unknown disturbance, the system may not distinguish whether hindrance is due to a transitional disturbance or steady disturbance. Therefore, for example, when the art of JP 2013-049389 A described above is applied to stoppage of the vehicle due to erroneous recognition of the road surface gradient, an unnatural behavior such as sliding-down of the vehicle is likely to be induced as a result of increase in the propulsive force being suppressed quickly. As above, the art of JP 2013-049389 A described above has a room of improvement concerning a behavior after increase in the propulsive force in the case of supplementing shortage of propulsive force due to an unknown disturbance by increasing propulsive force.

The present disclosure is made in the light of the problem as described above, and has an object to provide a vehicle control device capable of autonomously parking a vehicle in a target position without causing an unnatural behavior even when an unknown disturbance that hinders progress of the vehicle occurs.

In order to solve the above described problem, a first aspect of the present disclosure is applied to an autonomous parking control device which is mounted on a vehicle. The vehicle includes a propulsive force generating device that generates a propulsive force of the vehicle, and a state detecting sensor that detects an operating state of the vehicle. The autonomous parking control device is configured to execute vehicle traveling control that calculates a command value of the propulsive force based on the operating state detected by the state detecting sensor, and moves the vehicle to a target position autonomously by controlling the propulsive force generating device in accordance with the command value, and an additional command value varying process of adding a predetermined additional command value to the command value when the vehicle stops due to the propulsive force becoming insufficient during the vehicle traveling control, and decreasing or keeping the additional command value by a predetermined degree of suppression, when the vehicle which is stopped is started. Here, a remaining distance to the target position from a first position is larger than a remaining distance to the target position from a second position. The autonomous parking control device is configured to set the degree of suppression to be smaller as compared with a case of executing the additional command value varying process in the second position, when executing the additional command value varying process in the first position.

A second aspect of the present disclosure further has a feature as follows in the first aspect.

In the additional command value varying process, the additional command value is configured to continue to increase until the vehicle which is stopped starts.

A third aspect of the present disclosure further has a feature as follows, in the first aspect.

In the additional command value varying process, the degree of suppression is configured to be set to be larger as the additional command value at a time of the vehicle which is stopped being started is larger.

A fourth aspect of the present disclosure further has a feature as follows, in the first aspect.

The propulsive force generating device is configured by including a driving device that generates a driving force in the vehicle, and a braking device that generates a braking force in the vehicle. In the additional command value varying process, the additional command value is configured to be increased by increasing the driving force or decreasing the braking force, and the additional command value is configured to be decreased by decreasing the driving force or increasing the braking force.

A fifth aspect of the present disclosure further has a feature as follows, in the first aspect.

In the vehicle traveling control, the command value is configured to be calculated from an acceleration feedforward term that is a target acceleration of the vehicle, and a feedback term based on a difference between a target value and an actual value of a state quantity of the vehicle. The feedback term is configured by including at least any one of a speed feedback term that is calculated based on a difference between a target speed of the vehicle and an actual speed obtained from the operating state, a position feedback term that is calculated based on a difference between a target position of the vehicle and an actual position obtained from the operating state, and an acceleration feedback term that is calculated based on a difference between a target acceleration of the vehicle and an actual acceleration obtained from the operating state.

A sixth aspect of the present disclosure is applied to an autonomous parking control device mounted on a vehicle. The vehicle includes a propulsive force generating device that generates a propulsive force of the vehicle, and a state detecting sensor that detects an operating state of the vehicle. The autonomous parking control device is configured to execute vehicle traveling control that calculates a command value of the propulsive force based on the operating state detected by the state detecting sensor, and moves the vehicle to a target position autonomously by controlling the propulsive force generating device in accordance with the command value, and an additional command value varying process of adding a predetermined additional command value to the command value when a decrease amount of an actual speed of the vehicle from a target speed becomes larger than a predetermined first threshold during the vehicle traveling control, and decreasing or keeping the additional command value by a predetermined degree of suppression, when the decrease amount becomes smaller than a predetermined second threshold during addition of the additional command value. Here, a remaining distance to the target position from a first position is larger than a remaining distance to the target position from a second position. The autonomous parking control device is configured to set the degree of suppression to be smaller as compared with a case of executing the additional command value varying process in the second position when executing the additional command value varying process in the first position.

A seventh aspect of the present disclosure is applied to an autonomous parking system mounted on a vehicle. The autonomous parking system includes a propulsive force generating device that generates a propulsive force of the vehicle, a state detecting sensor that detects an operating state of the vehicle, and an autonomous parking control device. The autonomous parking control device is configured to execute vehicle traveling control that calculates a command value of the propulsive force based on the operating state detected by the state detecting sensor, and moves the vehicle to a target position autonomously by controlling the propulsive force generating device in accordance with the command value, and an additional command value varying process of adding a predetermined additional command value to the command value when the vehicle stops due to the propulsive force being insufficient during the vehicle traveling control, and decreasing or keeping the additional command value by a predetermined degree of suppression, when the vehicle which is stopped is started. Here, a remaining distance to the target position from a first position is larger than a remaining distance to the target position from a second position. The autonomous parking control device is configured to set the degree of suppression to be smaller as compared with a case of executing the additional command value varying process in the second position, when executing the additional command value varying process in the first position.

According to the first aspect, when the vehicle stops during vehicle traveling control for autonomous parking, the additional command value varying process of adding the additional command value to the command value of the propulsive force is executed. In the additional command value varying process, in the case where the vehicle which is stopped is started, the degree of suppression of the additional command value is set in response to the remaining distance to the target position. For example, in the additional command value varying process in the first position which is far from the target position, the degree of suppression is set to be smaller than in the additional command value varying process in the second position which is close to the target position. As a result, in the additional command value varying process in the second position close to the target position, immediately after the vehicle which is stopped is started, the vehicle is easily decelerated, so that the vehicle can be prevented from exceeding the target position. On the other hand, in the additional command value varying process in the first position which is far from the target position, immediately after the vehicle which is stopped is started, the vehicle is difficult to decelerate, so that an unnatural behavior such as sliding-down of the vehicle can be suppressed even on the road surface with a larger gradient than what is recognized by the sensor.

According to the second aspect, in the additional command value varying process, the additional command value is configured to continue to increase until the vehicle starts. Thereby, even when the vehicle stops due to an unknown disturbance, the vehicle can be restarted.

According to the third aspect, in the additional command value varying process, the degree of suppression is set to be larger as the additional command value at the time of start is larger. As the additional command value at the time of start is larger, a risk of exceeding the target position by running-out of the vehicle at the time of start is higher. According to the third aspect, it becomes possible to reduce the risk of exceeding the target position like this effectively.

According to the fourth aspect, the propulsive force generating device is configured by including the driving device and the braking device. Thereby, in the additional command value varying process, it becomes possible to increase the propulsive force by increasing the driving force or decreasing the braking force, and decrease the propulsive force by decreasing the driving force or increasing the braking force.

According to the fifth aspect, the operating state which is detected by the state detecting sensor is used in calculation of the feedback term, so that a steady-state disturbance factor due to a sensor error is superimposed on the command value. According to the present disclosure, an unnatural behavior of the vehicle can be suppressed by the additional command value varying process even when the unknown disturbance factor like this acts on the vehicle.

According to the sixth aspect, the additional command value varying process of adding the additional command value to the command value of the propulsive force is executed, when the decrease amount of the actual speed of the vehicle from the target speed becomes larger than the predetermined first threshold during vehicle traveling control for autonomous parking. In the additional command value varying process, the degree of suppression of the additional command value is set in response to the remaining distance to the target position when the decrease amount becomes smaller than the predetermined second threshold while the additional command value is added. For example, in the additional command value varying process in the first position which is far from the target position, the degree of suppression is set to be smaller than in the additional command value varying process in the second position which is close to the target position. As a result, in the additional command value varying process in the second position which is close to the target position, immediately after the vehicle which is stopped is started, the vehicle easily decelerates, so that the vehicle can be prevented from exceeding the target position. On the other hand, in the additional command value varying process in the first position which is far from the target position, immediately after the vehicle which is stopped is started, the vehicle is difficult to decelerate, so that an unnatural behavior such as sliding-down of the vehicle can be suppressed even on the road surface with a larger gradient than what is recognized by the sensor.

According to the seventh aspect, the autonomous parking system includes the propulsive force generating device which generates the propulsive force of the vehicle, the state detecting sensor that detects the operating state of the vehicle, and the autonomous parking control device. The autonomous parking control device is configured to execute the additional command value varying process of adding the additional command value to the command value of the propulsive force when the vehicle stops during the vehicle traveling control for autonomous parking. In the additional command value varying process, in the case where the vehicle which is stopped is started, the degree of suppression of the additional command value is set in response to the remaining distance to the target position. For example, in the additional command value varying process in the first position which is far from the target position, the degree of suppression is set to be smaller than in the additional command value varying process in the second position which is close to the target position. As a result, in the additional command value varying process in the second position which is close to the target position, immediately after the vehicle which is stopped is started, the vehicle is easily decelerated, so that the vehicle can be prevented from exceeding the target position. On the other hand, in the additional command value varying process in the first position which is far from the target position, immediately after the vehicle which is stopped is started, the vehicle is difficult to decelerate, so that an unnatural behavior such as sliding-down of the vehicle can be suppressed even on the road surface with a larger gradient than what is recognized by the sensor.

DESCRIPTION OF EMBODIMENT

Hereinafter, an embodiment of the present disclosure will be described with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the disclosure is explicitly specified by the numerals theoretically. Further, the structures, steps and the like that are described in the embodiments shown as follows are not always indispensable to the disclosure unless specially explicitly shown otherwise, or unless the disclosure is explicitly specified by the structures, steps and the like theoretically.

1. First Embodiment 1-1. Configuration of Autonomous Parking System

Figure 1:
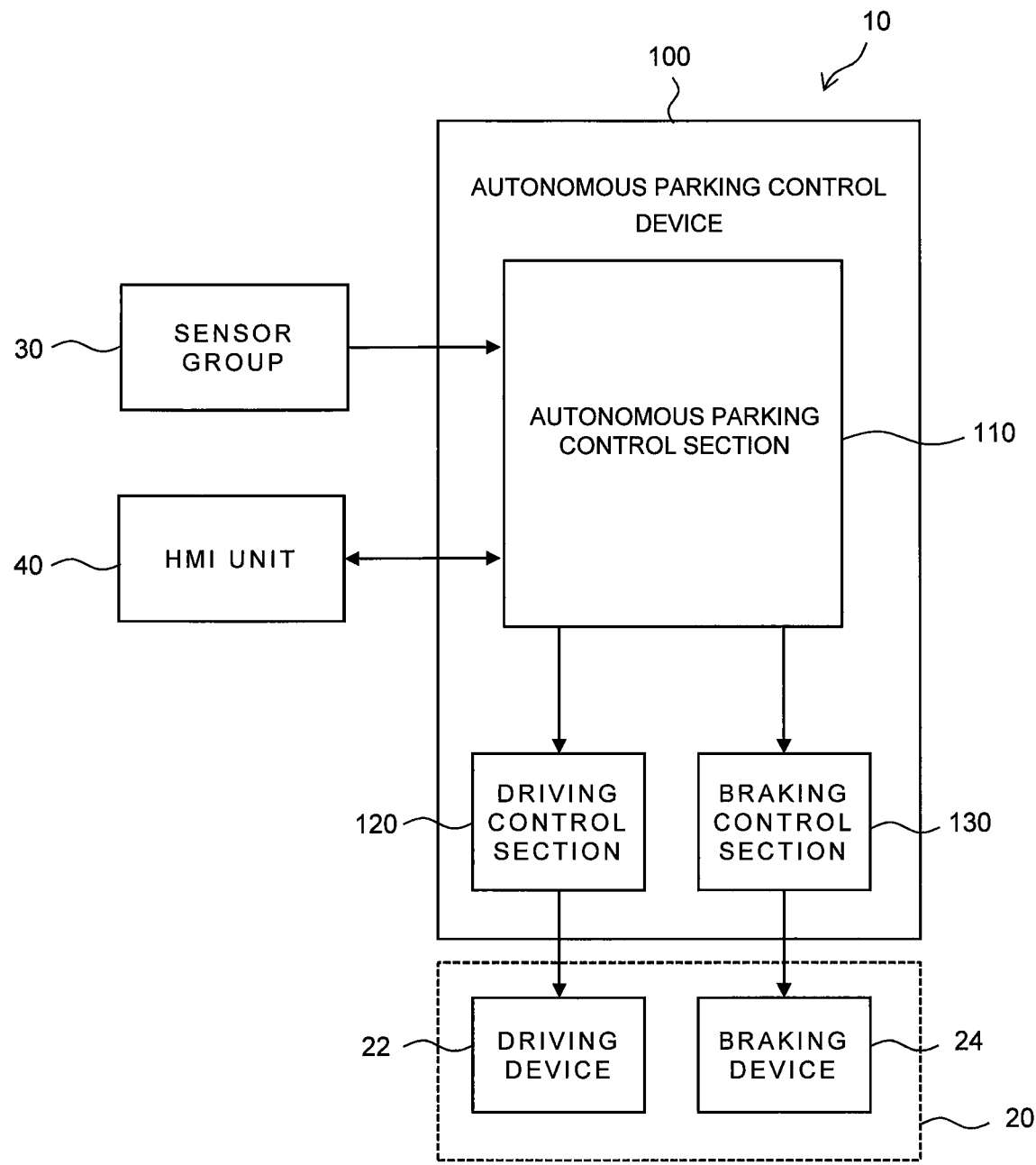
FIG. 1 is a block diagram illustrating a configuration example of an autonomous parking system according to a first embodiment.

FIG. 1 is a block diagram illustrating a configuration example of an autonomous parking system 10 according to the present embodiment. The autonomous parking system 10 is mounted on a vehicle, and provides an autonomous parking function of parking the vehicle autonomously. In the following explanation, a target parking position to which the vehicle is guided in autonomous parking will be described as "a target position". The autonomous parking system 10 executes "vehicle traveling control" for moving the vehicle to the target position autonomously.

The vehicle traveling control includes vehicle speed control including driving force control and braking force control, steering control and sift control. As described as follows, in the present embodiment, attention is specially paid to "vehicle speed control". Steering control and shift control are not specially limited.

The autonomous parking system 10 includes an autonomous parking control device 100, a propulsive force generating device 20, a sensor group 30 and an HMI (Human Machine Interface) unit 40.

The propulsive force generating device 20 includes a driving device 22 and a braking device 24. The driving device 22 generates a driving force of the vehicle. The driving device 22 is, for example, a power source such as an engine and an electric motor, and the generated driving force is transmitted to wheels via a transmission.

The braking device 24 generates a braking force. The braking device 24 includes a master cylinder, a brake actuator, and wheel cylinders provided at the respective wheels. The brake actuator supplies a brake fluid outputted from the master cylinder to the wheel cylinders to generate a braking force. The propulsive force generating device 20 outputs a difference between the driving force generated by the driving device 22 and the braking force generated by the braking device 24 as the propulsive force of the vehicle.

The sensor group 30 includes various sensors for detecting information necessary for the autonomous parking process. The sensor group 30 includes an external sensor for particularly recognizing a situation of surroundings of the vehicle. For example, the external sensor includes a camera that picks up images of the surroundings of the vehicle. Based on picked-up image information picked up by the camera, the external sensor recognizes the target position, and can calculate a remaining distance X to the target position from the present position of the vehicle. Further, the external sensor may include an ultrasonic sonar that detects an obstacle around the vehicle. By using the ultrasonic sonar, the remaining distance X to the target position can be calculated.

Further, the sensor group 30 includes a state detecting sensor that detects an operating state of the vehicle. For example, the state detecting sensor includes a wheel speed sensor that detects rotation of the wheels. Based on a detection result of the wheel speed sensor, the state detecting sensor can calculate a moving distance of the vehicle and the vehicle speed. Further, the state detecting sensor includes an acceleration sensor that detects an acceleration of the vehicle. Based on a detection result of the acceleration sensor, the state detecting sensor can calculate a gradient of the road surface. The sensor group 30 transmits the calculated information to the autonomous parking control device 100.

The HMI unit 40 is an interface for providing information to a driver of the vehicle, and receiving information from the driver. For example, the HMI unit 40 includes an input device, a display device and a speaker. As the input device, a touch panel, a keyboard, a switch and a button are illustrated. In particular, the input device includes "an autonomous parking switch" for turning on and off the autonomous parking function. The driver can input information to the HMI unit 40 by using the input device. The HMI unit 40 transmits information inputted by the driver to the autonomous parking control device 100.

The autonomous parking control device 100 is a device that controls autonomous parking. The autonomous parking control device 100 is realized by an ECU (Electronic Control Unit). The ECU is a microcomputer including an input/output interface, a memory and a processor. The autonomous parking control device 100 receives information from the sensor group 30 and the HMI unit 40, and controls autonomous parking based on the received information. In particular, the autonomous parking control device 100 executes "target position setting process" of setting the target position, and "vehicle traveling control" of controlling the propulsive force and moving the vehicle to the target position autonomously.

As illustrated in FIG. 1, the autonomous parking control device 100 includes an autonomous parking control section 110, a driving control section 120 and a braking control section 130, as functional blocks. The driving control section 120 controls an operation of the driving device 22, and controls the driving force. For example, the driving control section 120 increases the propulsive force by increasing the driving force, and decreases the propulsive force by decreasing the driving force. The braking control section 130 controls the braking force by controlling the operation of the braking device 24. For example, the braking control section 130 decreases the propulsive force by increasing the braking force and increases the propulsive force by decreasing the braking force. The autonomous parking control section 110 executes the target position setting process. Further, the autonomous parking control section 110 executes the vehicle traveling control with the driving control section 120 and the braking control section 130.

The function of the autonomous parking control device 100 is realized by the processor of the ECU executing a control program stored in the memory. The control program may be stored in a computer-readable storage medium. The autonomous parking control section 110, the driving control section 120 and the braking control section 130 may be realized respectively in separate ECUs.

1-2. Schematic Configuration of Autonomous Driving Control Section

Figure 2:
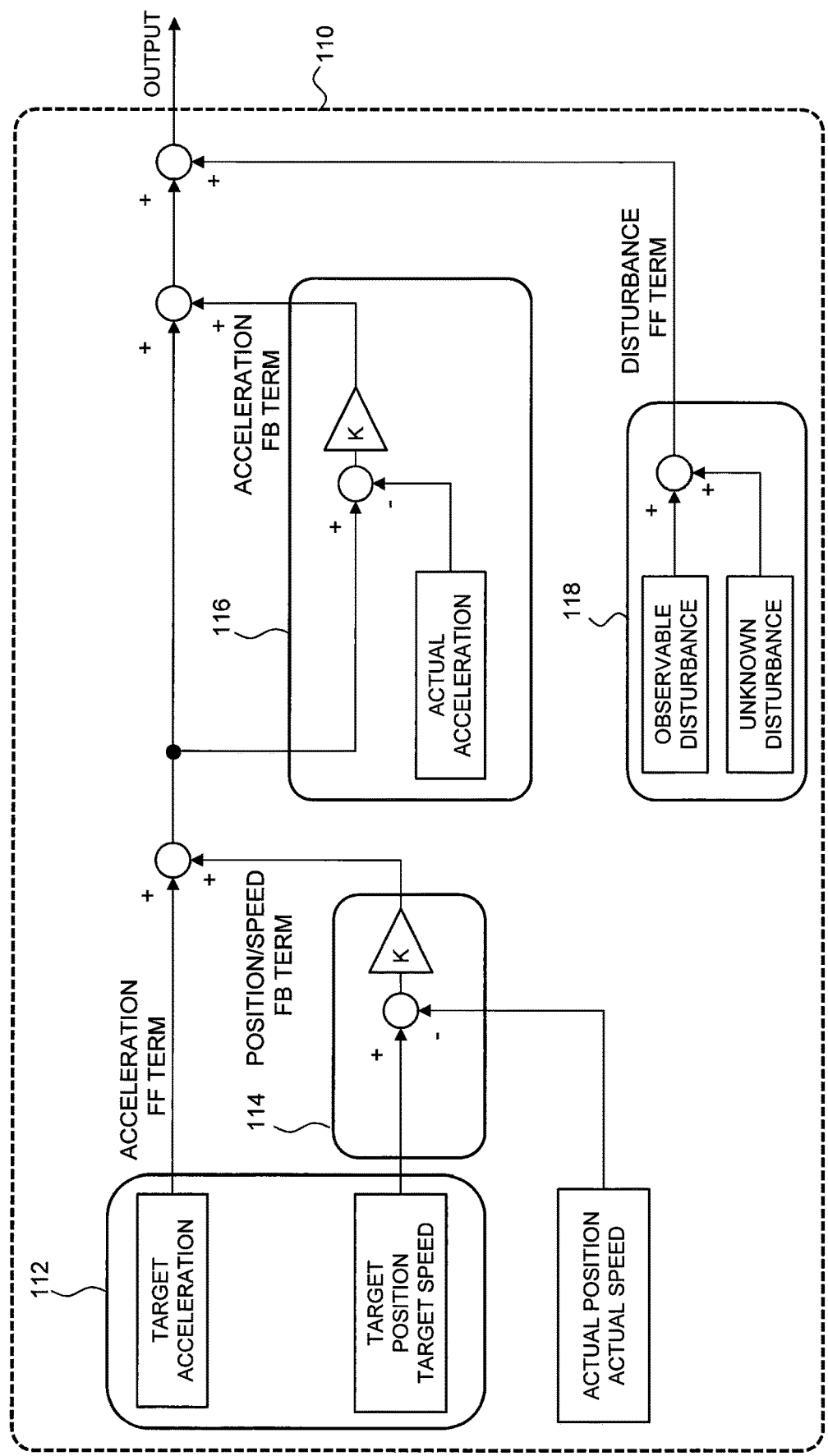
FIG. 2 is a control block diagram of an autonomous parking control section.

FIG. 2 is a control block diagram of the autonomous parking control section 110. The autonomous parking control section 110 includes a planner 112. The planner 112 calculates a target acceleration, a target speed and the target position in the case of causing the vehicle to travel along a travel route to the target position from a present position throughout a predetermined period from the present to a future.

The automated parking control section 110 uses the target acceleration calculated in the planner 112 as an acceleration feedforward term. Hereinafter, the acceleration feedforward term will be described as "the acceleration FF term". The autonomous parking control section 110 adds a position/speed feedback term to the acceleration FF term. The position/speed feedback term is a feedback term for causing an actual speed and an actual position of the vehicle to correspond to the target speed and the target position. Hereinafter, the position/speed feedback term will be described as "the position/speed FB term". The position/speed FB term is calculated in a position/speed FB term calculating section 114 of the autonomous parking control section 110. The position/speed FB term calculating section 114 calculates differences between a planned position and a planned speed, and the actual position and the actual speed which are acquired from detection values of the sensor group 30 respectively, and calculates the position/speed FB term by proportional control or the like to the differences.

The autonomous parking control section 110 adds an acceleration feedback term for causing an actual acceleration of the vehicle to correspond to the target acceleration which is obtained by adding the position/speed FB term to the acceleration FF term. In the following explanation, the acceleration feedback term will be described as "the acceleration FB term". The acceleration FB term is calculated in an acceleration FB term calculating section 116 of the autonomous parking control section 110. The acceleration FB term calculating section 116 calculates a difference between the target acceleration and an actual acceleration acquired from a detection value of the sensor group 30, and calculates the acceleration FB term by proportional-plus-integral control or the like to the difference.

A proportional term of the acceleration FB term absorbs a transitional disturbance that transitionally occurs such as road surface irregularity. Further, an integral term of the acceleration FB term absorbs a steady-state disturbance that occurs steadily such as a loading capacity error and a sensor error. The acceleration FB term calculating section 116 sets respective gains so that responsiveness to a transitional disturbance and convergence to a steady-state disturbance satisfy design indexes in an ordinary traveling region.

The autonomous parking control section 110 adds a disturbance feedforward term for correcting an influence of a disturbance to the target acceleration. In the following explanation, the disturbance feedforward term is described as "the disturbance FF term". The disturbance FF term is calculated in a disturbance FF term calculating section 118 of the autonomous parking control section 110. The disturbance FF term calculating section 118 calculates an observable disturbance FF term for correcting an observable disturbance that is observable of disturbances that act on the vehicle. As the observable disturbance, for example, a road surface gradient, air resistance, cornering drag and the like are illustrated. Further, the disturbance FF term calculating section 118 calculates an unknown disturbance FF term for correcting an unknown disturbance which is unobservable of the disturbances that act on the vehicle. As the unknown disturbance, for example, a level difference, a loading capacity, a sensor error and the like are illustrated. Note that details of calculation of the unknown disturbance FF term will be described later. The disturbance FF term calculating section 118 outputs a value obtained by adding up the observable disturbance FF term and the unknown disturbance FF term as a disturbance FF term.

The autonomous parking control section 110 outputs the target acceleration which is obtained by adding the disturbance FF term to the target acceleration to the driving control section 120 and the braking control section 130 as a command value for controlling the propulsive force of the vehicle.

1-3. Basic Operation of Vehicle Traveling Control

Figure 3:
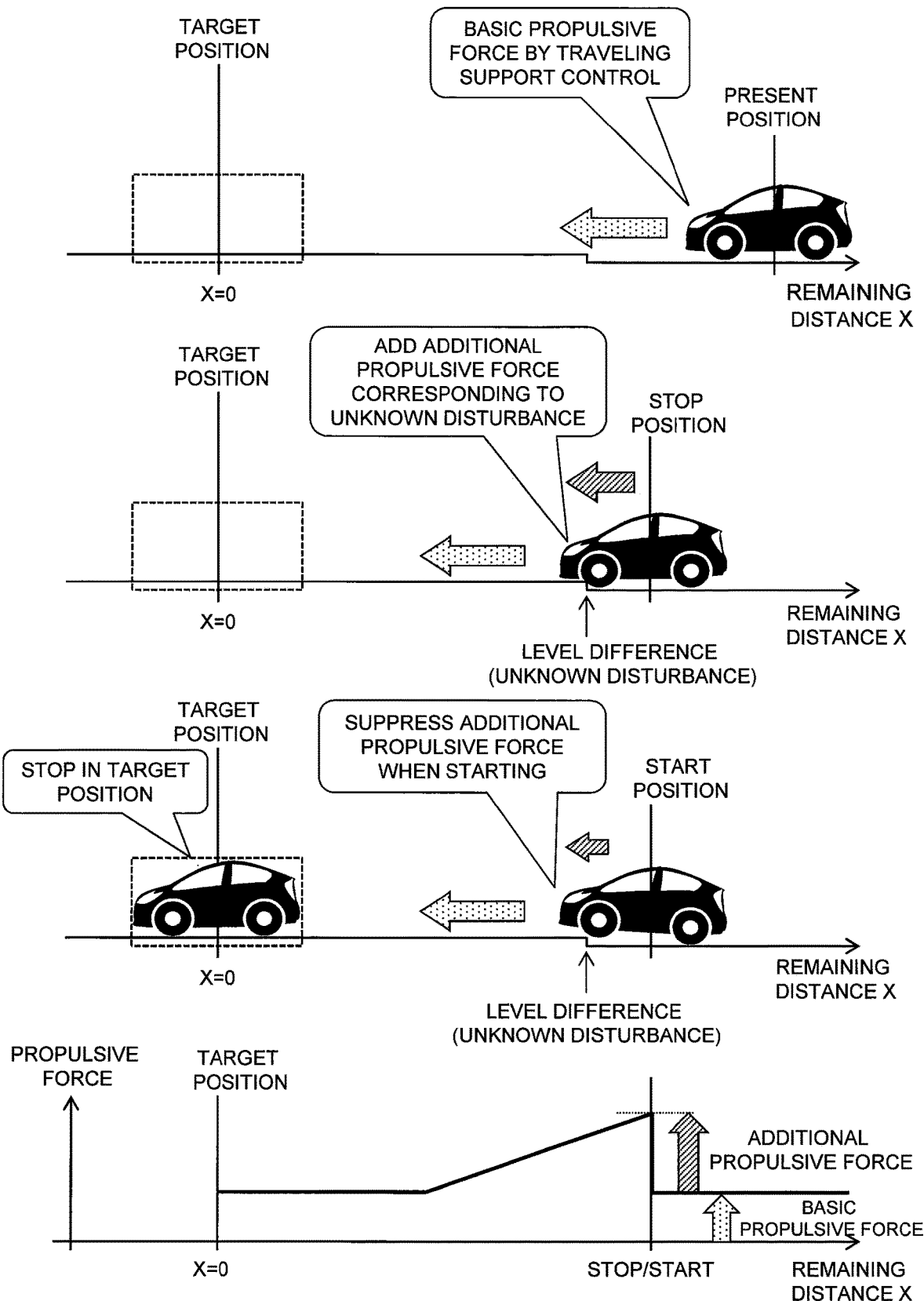
FIG. 3 is a conceptual diagram for explaining a basic operation of vehicle traveling control according to the first embodiment.

With reference to FIG. 3, a basic operation of vehicle traveling control that is executed in the autonomous parking system 10 according to the present embodiment will be described. FIG. 3 is a conceptual diagram for explaining the basic operation of the vehicle traveling control according to the present embodiment. The example illustrated in the drawing illustrates a basic operation in a case where the vehicle stops due to a level difference during vehicle traveling control. The level difference like this corresponds to the transitional disturbance that occurs transitionally, among the unknown disturbances which are unobservable. A diagram on a first tier in FIG. 3 illustrates a state where the vehicle is traveling by exhibiting a basic propulsive force. The basic propulsive force in this case shows a propulsive force of the vehicle which is calculated when the unknown disturbance FF term is zero.

A diagram on a second tier in FIG. 3 illustrates a case where the vehicle stops due to a level difference during vehicle traveling control. In this way, when a disturbance which is more than assumed in the autonomous parking control section 110 occurs, a feedback system does not sometimes function normally. In this case, there is a risk that the vehicle behavior becomes unstable by excess or deficiency of the propulsive force.

Therefore, in the vehicle traveling control according to the present embodiment, a propulsive force is added when the propulsive force becomes insufficient and the vehicle stops during the vehicle traveling control. The addition of the propulsive force is executed by the unknown disturbance FF term of the disturbance FF term calculating section 118. More specifically, the disturbance FF term calculating section 118 increases the target acceleration as the command value by increasing the unknown disturbance FF term. That is, the unknown disturbance FF term functions as an "additional command value" which is added to a command value. When the target acceleration increases, the propulsive force that is generated from the vehicle increases. In the following explanation, an increase amount of the propulsive force due to variation in the unknown disturbance FF term will be described as an "additional propulsive force". Further, a process of varying the additional propulsive force by varying the unknown disturbance FF term as the additional command value will be described an "additional propulsive force varying process". The disturbance FF term calculating section 118 continues to increase the unknown disturbance FF term until the vehicle which is stopped starts again. Note that the "unknown disturbance FF term" of the present embodiment corresponds to the "additional command value" of the present disclosure, and the "additional propulsive force varying process" corresponds to an "additional command value varying process" of the present disclosure.

A diagram in a third tier in FIG. 3 illustrates a state until the vehicle which starts again stops in the target position. The transitional disturbance factor due to the level difference is eliminated by the start of the vehicle. Therefore, in the vehicle traveling control according to the present embodiment, the additional propulsive force is decreased when the vehicle which is stopped starts again. A chart illustrated on a fourth tier in FIG. 3 illustrates a state where the additional propulsive force is gradually decreased in a process until the vehicle moves to the target position after the vehicle starts.

According to the vehicle traveling control like this, even when the propulsive force becomes insufficient due to the transitional disturbance during the vehicle traveling control, the vehicle can be started with a stable behavior by addition of the additional propulsive force. Further, the additional propulsive force is decreased after the vehicle is started, so that a risk of exceeding the target position can be decreased.

1-4. Characteristic of Vehicle Traveling Control

In the aforementioned vehicle traveling control, the additional propulsive force is added by the additional propulsive force varying process when the vehicle encounters a transitional disturbance such as a level difference. However, the inventor of the present application recognized a problem as follows concerning the aforementioned vehicle traveling control. This is as follows. In the unknown disturbances which are unobservable, there are steady-state disturbances which occur due to the loading capacity error and the sensor error, besides the transitional disturbances such as the level difference described above. If the unknown disturbance that acts on the vehicle which is stopped is a transitional disturbance, it may be preferable to suppress the additional propulsive force quickly after start of the vehicle. If the unknown disturbance which acts on the vehicle is a steady-state disturbance on the other hand, it may be preferable that the additional propulsive force is not be suppressed even after start of the vehicle. The autonomous parking control device 100 may not distinguish whether the unknown disturbance which acts on the vehicle is a transitional disturbance or a steady-state disturbance. Therefore, there is a risk that a degree of suppression of the additional propulsive force may not be properly controlled with the vehicle traveling control described above. The problem will be described in more detail with reference to the drawings.

Figure 4:
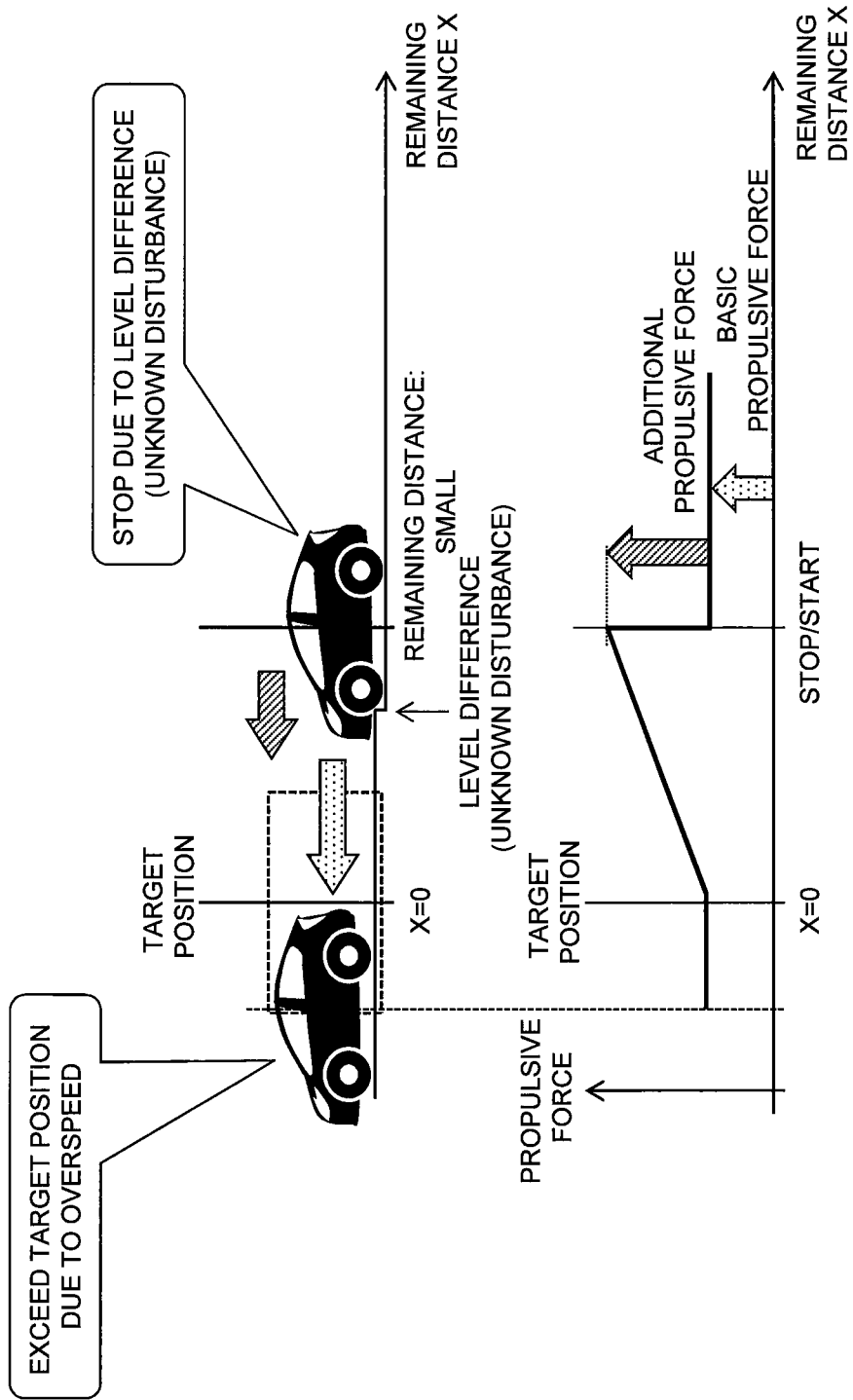
FIG. 4 is a diagram for explaining one example of a problem of the vehicle traveling control.

FIG. 4 is a diagram for explaining an example of the problem of the vehicle traveling control. An example illustrated in the drawing illustrates a case where a transitional disturbance occurs during the vehicle traveling control, and the additional propulsive force varying process is executed. As illustrated in the drawing, in the additional propulsive force varying process in a case of the remaining distance X being small, decrease in the additional propulsive force in the case of the stopped vehicle being started again becomes insufficient, and the vehicle is likely to exceed the target position.

Figure 5:
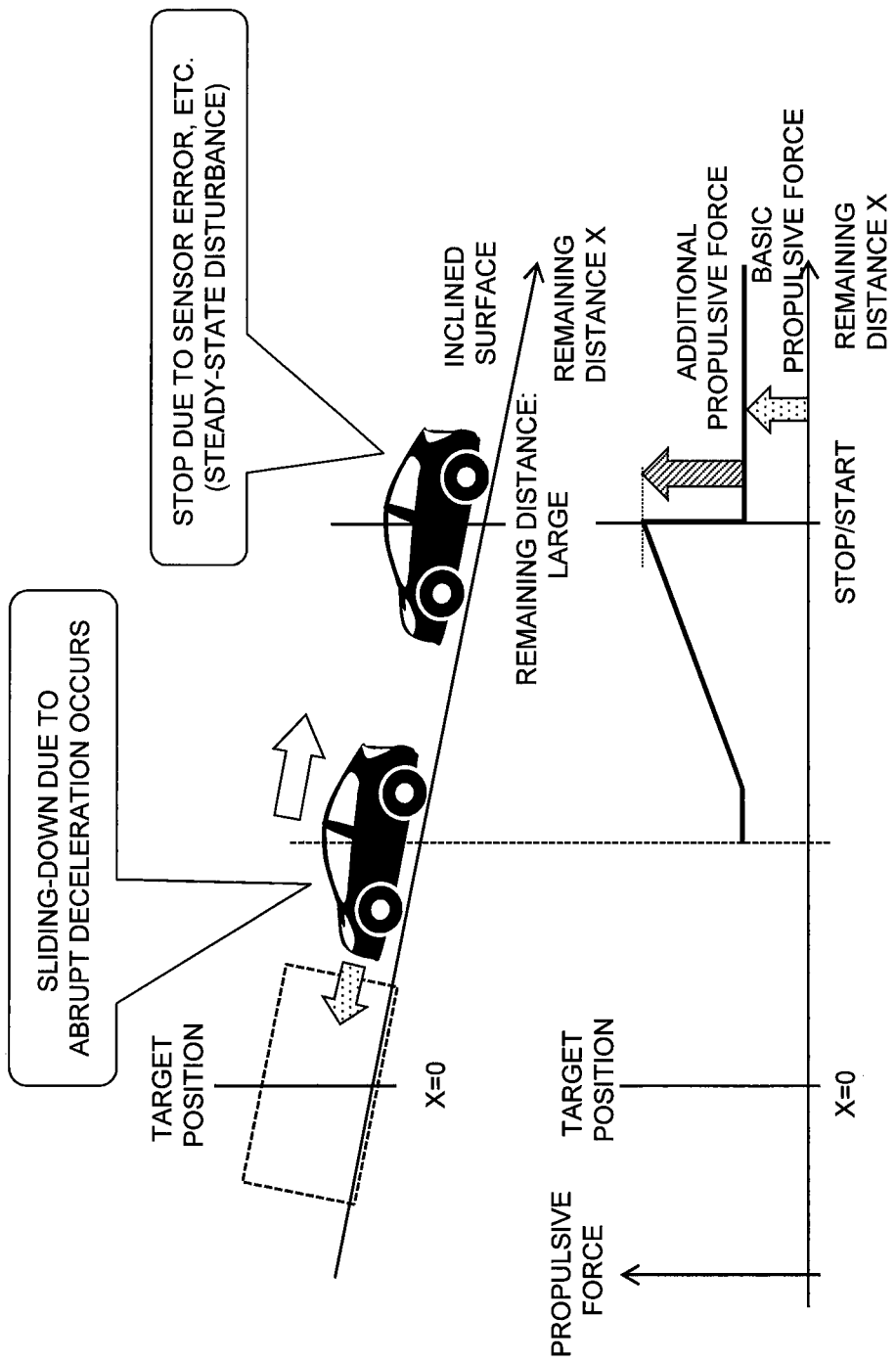
FIG. 5 is a diagram for explaining another example of the problem of the vehicle traveling control.

FIG. 5 is a diagram for explaining another example of the problem of the vehicle traveling control. An example illustrated in the drawing illustrates a case where the steady-state disturbance due to a sensor error occurs during the vehicle traveling control, and the additional propulsive force varying process is executed. As illustrated in the drawing, when a road surface gradient calculated from the detection result of the acceleration sensor is detected as more gradual than an actual gradient, the vehicle may stop due to insufficiency of the propulsive force. As described above, the autonomous parking control device 100 may not distinguish whether the unknown disturbance acting on the vehicle is a transitional disturbance or a steady-state disturbance. Therefore, if a process similar to the additional propulsive force varying process at the time of the transitional disturbance is executed at the time of occurrence of the steady-state disturbance like this, the propulsive force becomes insufficient again due to decrease in the additional propulsive force in the case where vehicle which is stopped is started again, and an unnatural behavior such as sliding-down of the vehicle is likely to occur.

The vehicle traveling control which is executed in the autonomous parking system 10 of the present embodiment has a characteristic in an operation of changing the degree of suppression of the additional propulsive force in the additional propulsive force varying process in response to the remaining distance X. More specifically, in a case where the remaining distance X is X2 which is smaller than X1, the autonomous parking system 10 makes the degree of suppression of the additional propulsive force in the additional propulsive force varying process larger than in the case where the remaining distance X is X1.

Figure 6:
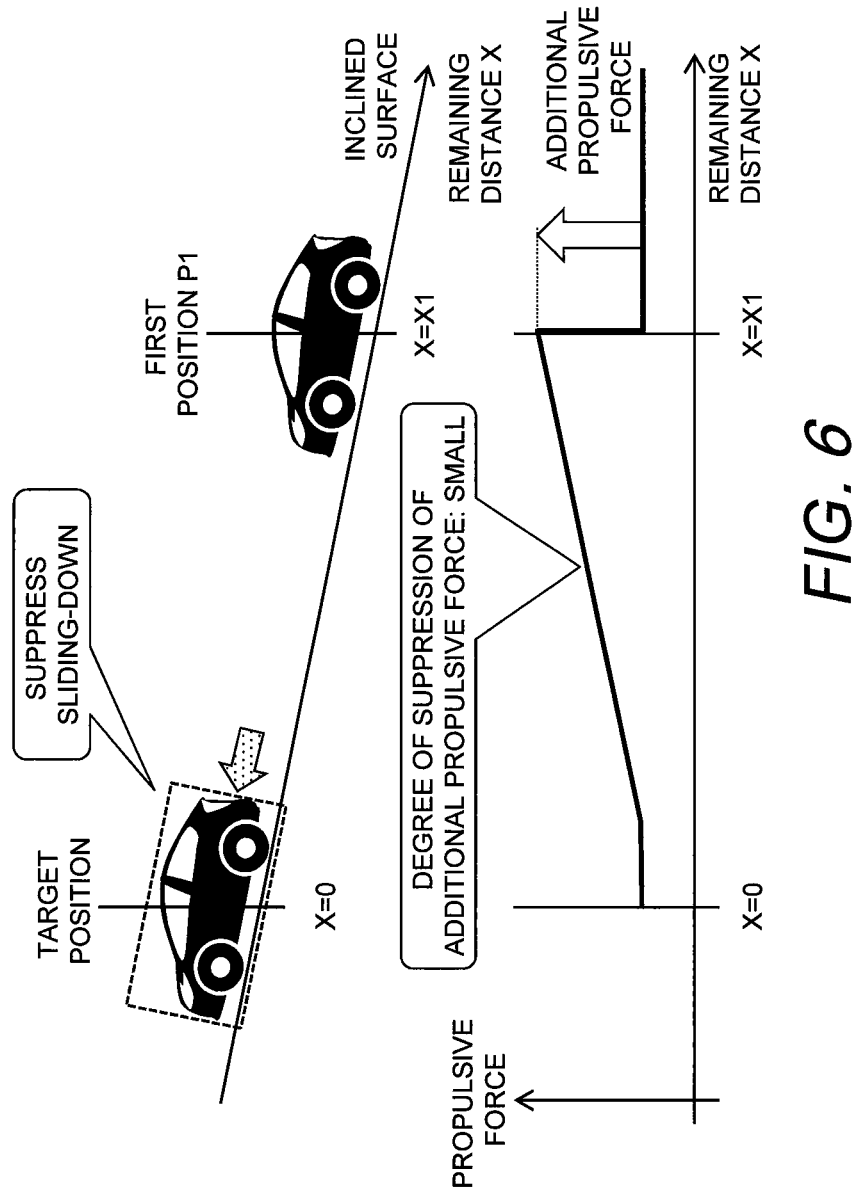
FIG. 6 is a diagram for explaining an additional propulsive force varying process that is executed in the autonomous parking system of the first embodiment.
Figure 7:
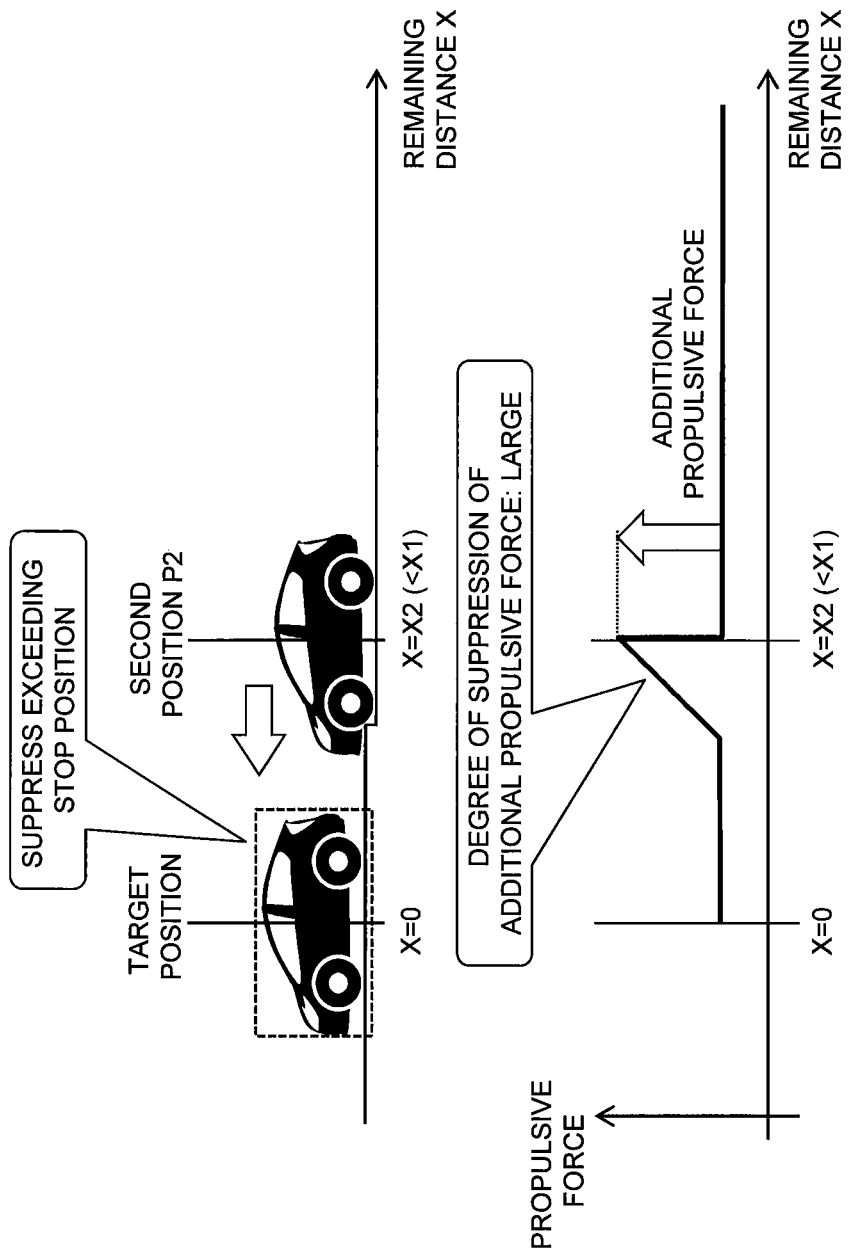
FIG. 7 is a diagram for explaining the additional propulsive force varying process that is executed in the autonomous parking system of the first embodiment.

FIGS. 6 and 7 are diagrams for explaining the additional propulsive force varying process which is executed in the autonomous parking system 10 of the present embodiment. An example illustrated in FIG. 6 illustrates a state of a change in the propulsive force at a time of the additional propulsive force varying process being started in a first position P1 in which the remaining distance X is X1. Further, an example illustrated in FIG. 7 illustrates a state of a change of the propulsive force at a time of the additional propulsive force varying process being started in a second position P2 where the remaining distance X is X2.

As illustrated in FIG. 6, in the case where the remaining distance X is X1, the degree of suppression of the additional propulsive force in the additional propulsive force varying process is made smaller than in the case where the remaining distance X is X2. As a result, when the factor which inhibits start of the vehicle in the first position P1 is a steady-state disturbance, the additional propulsive force is gradually decreased or kept after start of the vehicle. Thereby, occurrence of an unnatural behavior such as sliding-down can be suppressed. Note that as the remaining distance X is larger, the possibility of exceeding the target position becomes lower. Therefore, even if the factor which inhibits the start of the vehicle in the first position P1 is a transitional disturbance, the possibility of exceeding the target position can be suppressed to be low.

Further, as illustrated in FIG. 7, in the case where the remaining distance X is X2, the degree of suppression of the additional propulsive force in the additional propulsive force varying process is made larger than in the case where the remaining distance is X1. As a result, when the factor which inhibits the start of the vehicle in the second position P2 is a transitional disturbance, the additional propulsive force is decreased quickly after start of the vehicle. Thereby, exceeding the target position can be suppressed. Note that as the remaining distance X is smaller, a possibility of sliding-down becomes lower. Therefore, even when the factor which inhibits start of the vehicle in the second position P2 is a steady-state disturbance, the possibility of occurrence of an unnatural behavior such as sliding-down can be suppressed to be low.

In this way, according to the autonomous parking system 10 of the present embodiment, the degree of suppression of the additional propulsive force is set in response to the remaining distance X in the propulsive force varying process during the vehicle traveling control. Thereby, exceeding the target position and an unnatural behavior of the vehicle due to disturbances during the vehicle traveling control are suppressed.

1-5. Specific Process

Figure 8:
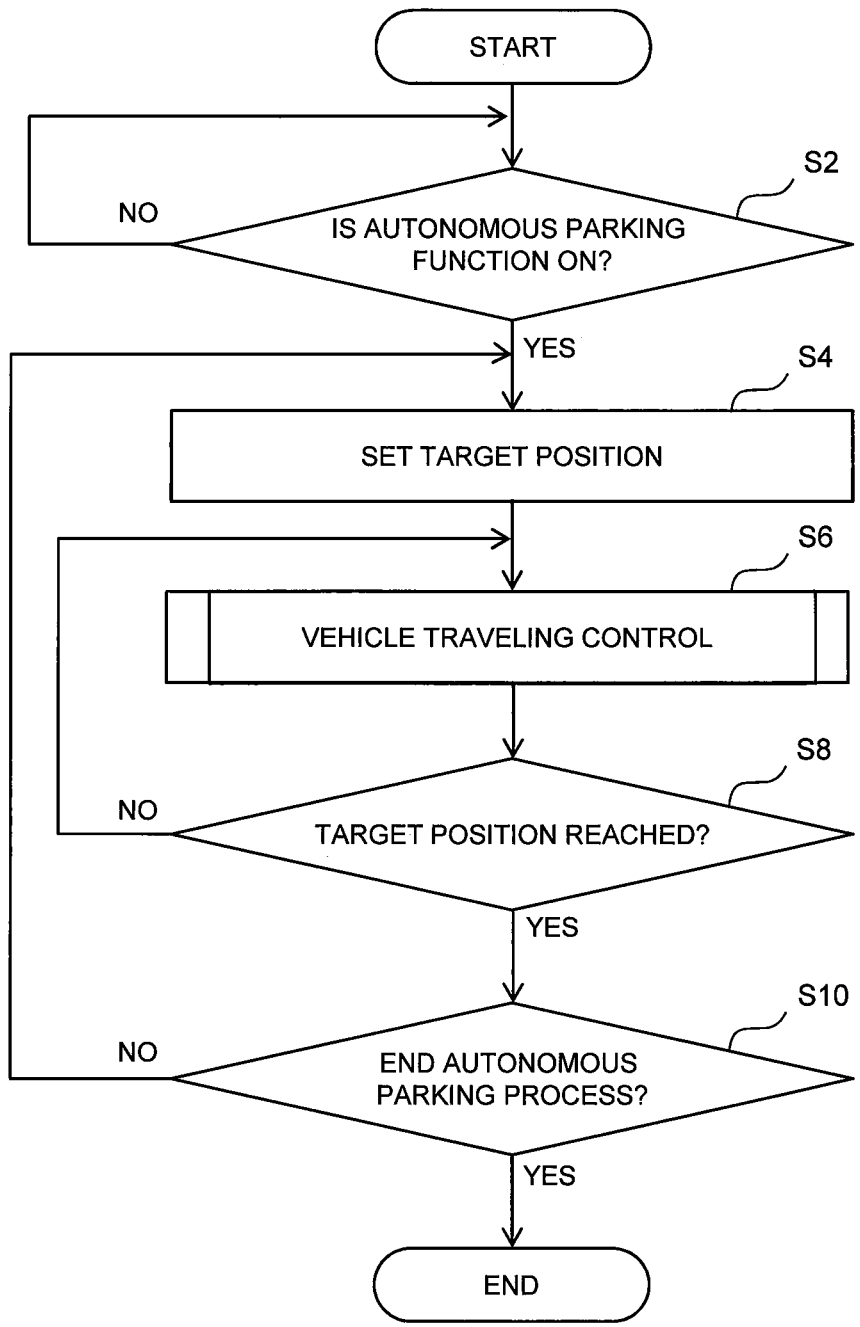
FIG. 8 is a flowchart illustrating a process that is executed in an autonomous parking control device of the autonomous parking system of the first embodiment.

Next, a specific process that is executed in the autonomous parking control device 100 of the autonomous parking system 10 of the first embodiment including the aforementioned configuration will be described with reference to a flowchart. FIG. 8 is a flowchart illustrating a process that is executed in the autonomous parking control device 100 of the autonomous parking system 10 of the present embodiment.

First, the autonomous parking control section 110 detects that the autonomous parking function is turned on (step S2). An autonomous parking switch for turning on and off the autonomous parking function is included in the HMI unit 40. The driver can turn on the autonomous parking function by operating the autonomous parking switch. When it is detected that the autonomous parking function is turned on, the autonomous parking control section 110 starts the autonomous parking process. Subsequently, the process shifts to next step S4.

Next, the autonomous parking control section 110 executes a "target position setting process" of setting the target position (step S4). The target position setting process is executed based on the detection information received from the sensor group 30. For example, the sensor group 30 includes a camera that picks up images of the surroundings of the vehicle. By executing image analysis of the picked-up image information picked up by the camera, a parking space enclosed by a white line or the like can be recognized. The autonomous parking control section 110 sets the target position autonomously by considering the recognized parking space, the size of the vehicle and the like. The autonomous parking control section 110 may display the recognized parking space and the set target position on the display device. The driver can recognize the parking space and the target position that are displayed on the display device.

Alternatively, the parking space and the target position may be designated by the driver. For example, the autonomous parking control section 110 displays the picked-up image information picked up by the camera on the display device of the HMI unit 40. The driver designates the parking space and the target position from the displayed image by using an input device of the HMI unit 40.

When setting of the target position is completed, the process shifts to a next step. In the next step, the autonomous parking control section 110, the driving control section 120 and the braking control section 130 execute "vehicle traveling control" that causes the vehicle to move autonomously to the target position by controlling the propulsive force composed of the driving force and the braking force (step S6).

Figure 9:
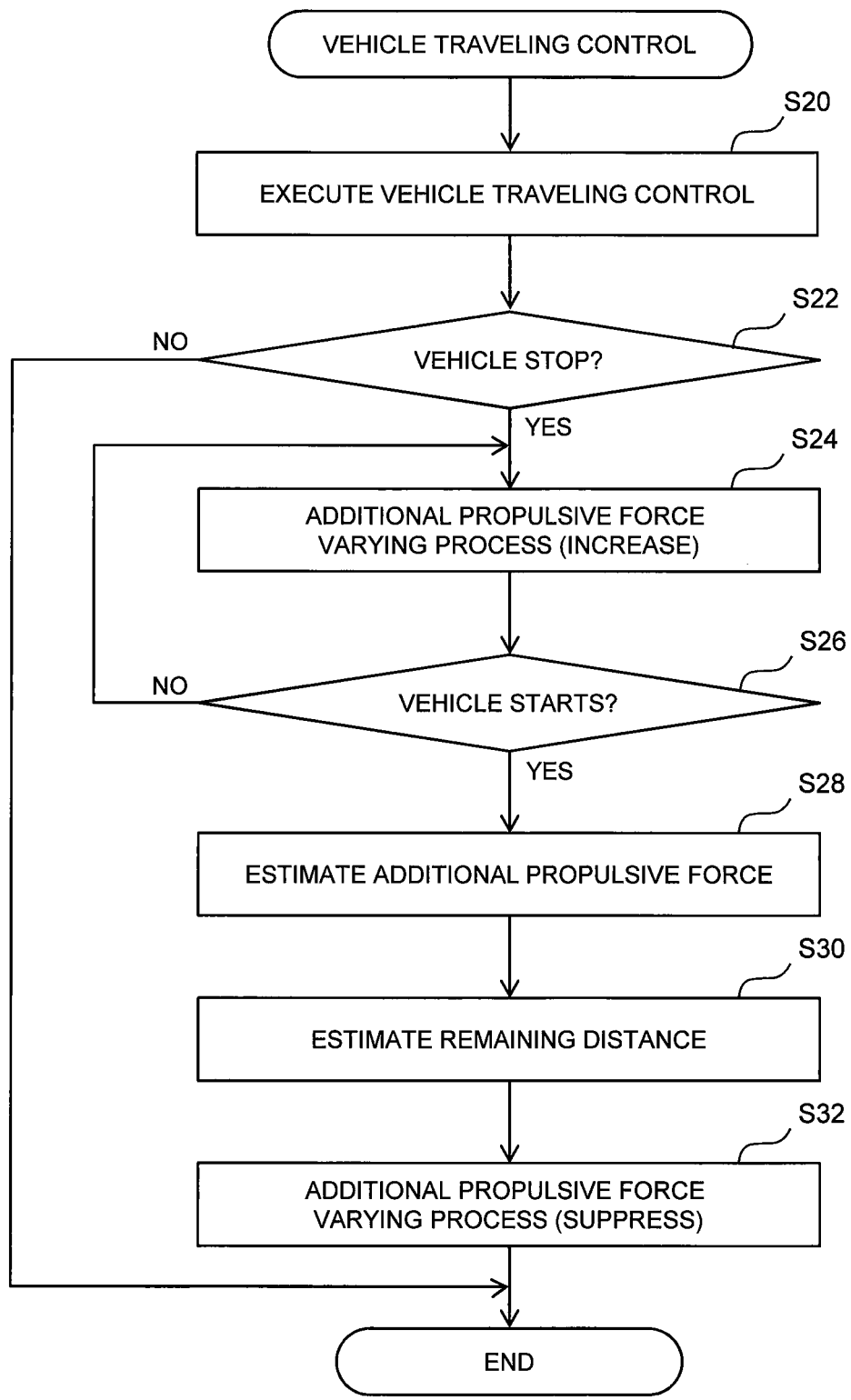
FIG. 9 is a flowchart illustrating a process of vehicle traveling control that is executed in the autonomous parking control device of the autonomous parking system of the first embodiment.

FIG. 9 is a flowchart illustrating a process of the vehicle traveling control which is executed in the autonomous parking control device 100 of the autonomous parking system 10 of the present embodiment. The autonomous parking control section 110 executes a subroutine illustrated in FIG. 9 in the processing of step S6 described above.

In the subroutine illustrated in FIG. 9, the autonomous parking control section 110 executes vehicle traveling control (step S20). Here, the autonomous parking control section 110 outputs the target acceleration which is obtained by adding the position/speed FB term, the acceleration FB term and the disturbance FF term to the acceleration FF term to the driving control section 120 and the braking control section 130 as a command value for controlling the propulsive force of the vehicle. The driving control section 120 and the braking control section 130 calculate operating amounts of the driving device 22 and the braking device 24 based on the inputted command value, and output the operating amounts to the propulsive force generating device 20. Subsequently, the process shifts to next step.

Next, the autonomous parking control section 110 determines whether or not the vehicle stops (step S22). When the vehicle does not stop as a result, the process of the present routine is ended. When the vehicle stops on the other hand, it is determined that the propulsive force of the vehicle is insufficient due to a disturbance factor, and the process shifts to a process of a next step.

In the next step, the autonomous parking control section 110 executes the additional propulsive force varying process to increase the propulsive force of the vehicle (step S24). More specifically, the autonomous parking control section 110 increases the target acceleration by increasing the unknown disturbance FF term of the disturbance FF term calculating section 118 by a predetermined amount.

In a next step, the autonomous parking control section 110 determines whether or not the vehicle which is stopped starts (step S26). When the vehicle does not start yet as a result, the process returns to step S24 again. When the vehicle starts on the other hand, the process shifts to a process of a next step.

In the next step, the autonomous parking control section 110 estimates a magnitude of the additional propulsive force corresponding to a propulsive force increase amount by the unknown disturbance (step S28). Here, the autonomous parking control section 110 calculates the driving force and the braking force based on the command values outputted to the driving control section 120 and the braking control section 130 at the time of start of the vehicle. Subsequently, the autonomous parking control section 110 calculates an output corresponding to the disturbance which acts on the vehicle by decreasing the braking force and an inertial force from the driving force. Next, the autonomous parking control section 110 calculates an output corresponding to the observable disturbance by multiplying the observable disturbance FF term outputted from the disturbance FF term calculating section 118 by a vehicle weight of the vehicle. Subsequently, the autonomous parking control section 110 calculates the additional propulsive force corresponding to the output of the unobserved disturbance by subtracting the output corresponding to the observable disturbance from the output corresponding to the disturbance.

Figure 10:
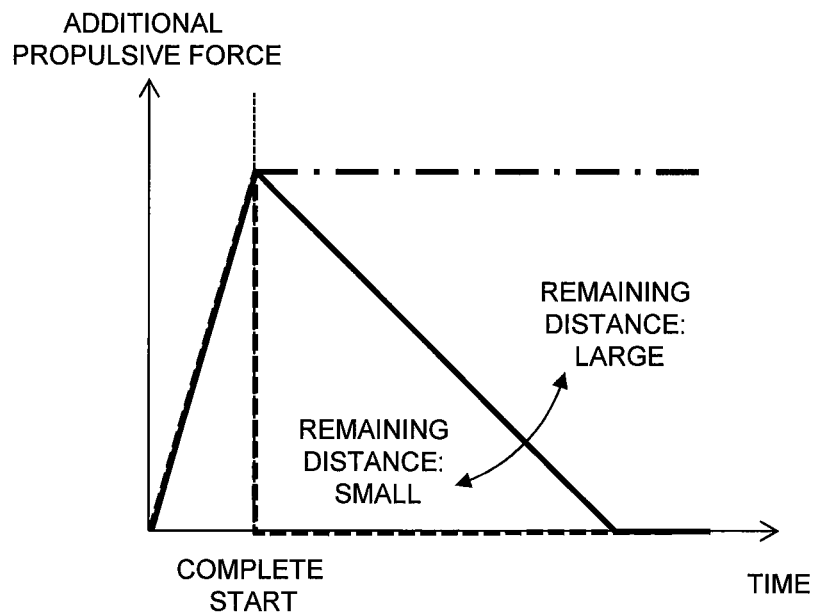
FIG. 10 is a diagram illustrating one example of a degree of suppression of an additional propulsive force.

In a next step, the autonomous parking control section 110 calculates the remaining distance X based on the information obtained from the sensor group 30 (step S30). In a next step, the autonomous parking control section 110 decreases the additional propulsive force in response to the remaining distance X (step S32). FIG. 10 is a diagram illustrating an example of the degree of suppression of the additional propulsive force. As illustrated in the drawing, the autonomous parking control section 110 sets the degree of suppression of the additional propulsive force so that as the remaining distance X is larger, the degree of suppression of the additional propulsive force becomes smaller. The autonomous parking control section 110 decreases the additional propulsive force calculated by the process in step S28 at the degree of suppression which is set. When the process of step S32 is completed, the present subroutine is finished.

When the vehicle traveling control is executed in step S6 described above, the autonomous parking control section 110 determines whether or not the vehicle reaches the target position next (step S8). When the vehicle does not reach the target position yet, the process returns to step S6 again. When the vehicle reaches the target position on the other hand, the process shifts to next step S10.

Next, the autonomous parking control section 110 determines whether or not to end the autonomous parking process (step S10). For example, when turning a steering wheel quickly in one direction then the other or redoing is required, the process returns to step S4. Otherwise, the autonomous parking control section 110 ends the autonomous parking process.

As described above, according to the present embodiment, when the vehicle stops by an unknown disturbance during vehicle traveling control, the additional propulsive force is added to the propulsive force. Thereby, the vehicle which is stopped due to the unknown disturbance can be efficiently started. Further, according to the present embodiment, the degree of suppression of the additional propulsive force after start is set in response to the remaining distance X. Thereby, the additional propulsive force in the case of the remaining distance X being small is decreased quickly, so that exceeding the target position in the case of the unknown disturbance factor being the transitional disturbance is suppressed. Further, the additional propulsive force in the case of the remaining distance X being large is gradually decreased, so that an unnatural behavior of the vehicle in the case of the unknown disturbance factor being a steady-state disturbance is suppressed. As a result, reliability on the autonomous parking system 10 increases.

1-6. Modified Example of Autonomous Parking System 10 According to Present Embodiment To the autonomous parking system 10 according to the present embodiment, a configuration modified as follows can be applied. Note that a modification example as follows can be also applied to an autonomous parking system according to a second embodiment that will be described later.

The degree of suppression which is set in step S32 described above also includes a mode of keeping the additional propulsive force without being limited to a mode of decreasing the additional propulsive force. That is, in step S32 described above, for example, the autonomous parking control section 110 may control to keep the additional propulsive force when the remaining distance X is large. Further, the degree of suppression is not limited to the mode illustrated in FIG. 10. That is, the degree of suppression is not limited to a change degree if only the degree of suppression is set so that the additional propulsive force decreases or is kept with a lapse of time.

Figure 11:
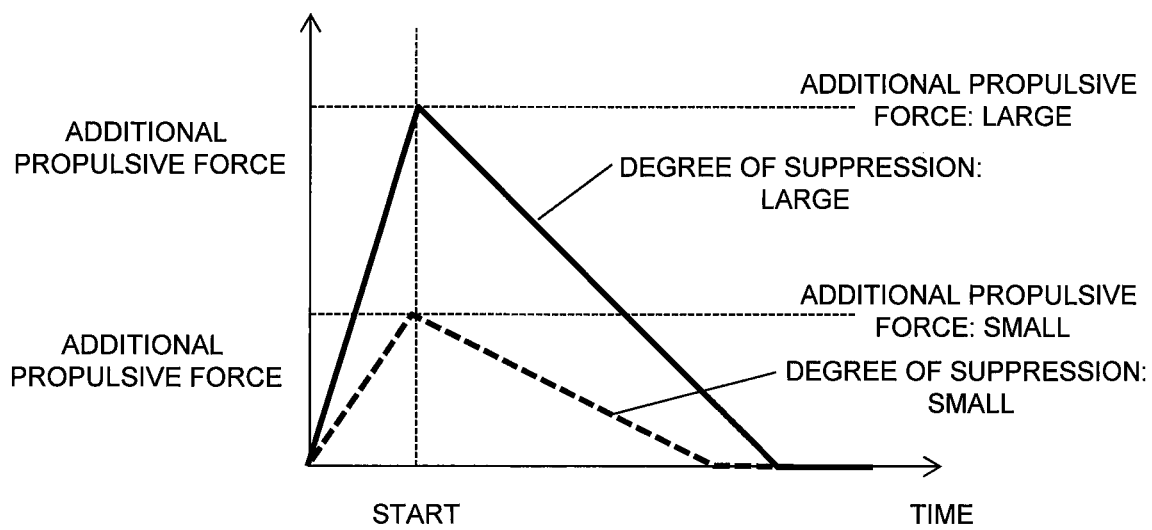
FIG. 11 is a diagram illustrating another example of the degree of suppression of the additional propulsive force.

For example, a mode may be adopted, in which the degree of suppression of the additional propulsive force is set according to the magnitude of the additional propulsive force. FIG. 11 is a diagram illustrating another example of the degree of suppression of the additional propulsive force. In the example illustrated in the drawing, the degree of suppression is set at a larger value as the additional propulsive force is larger. As the additional propulsive force is larger, a possibility of the unknown disturbance factor being the transitional disturbance such as a level difference is higher. Further, as the additional propulsive force is larger, a risk of exceeding the target position becomes larger. In the example illustrated in FIG. 11, the degree of suppression can be set at a larger value as the possibility of the disturbance facer being a larger transitional disturbance is higher, so that exceeding the target position is effectively avoided.

The command value which is outputted from the autonomous parking control section 110 is not limited to the target acceleration. That is, the command value can be a value for controlling the propulsive force of the vehicle. For example, the command value may be the propulsive force which is obtained by multiplying the target acceleration by the weight of the vehicle. In this case, the target acceleration after the disturbance FF term is added may be converted into a propulsive force, or the target acceleration before the disturbance FF term is added may be converted into a propulsive force, and the disturbance FF term that is converted into the propulsive force may be added.

The estimation method of the additional propulsive force is not limited to the aforementioned method. That is, in the process in step S28 described above, for example, a value of the unknown disturbance FF term is calculated by subtracting the observable disturbance FF term from the disturbance FF term which is outputted from the disturbance FF term calculating section 118. Subsequently, the autonomous parking control section 110 may calculate the additional propulsive force which is an increase amount of the propulsive force due to the unknown disturbance by multiplying the unknown disturbance FF term by the weight of the vehicle.

2. Second Embodiment

2-1. Characteristic of Second Embodiment

In the aforementioned first embodiment, the additional propulsive force varying process is executed when an unknown disturbance occurs and the vehicle stops during vehicle traveling control. In the second embodiment, the additional propulsive force varying process is executed, when an unknown disturbance occurs during vehicle traveling control and the vehicle decelerates. A configuration of the autonomous parking system of the second embodiment is similar to the configuration of the autonomous parking system 10 of the first embodiment. Further, a basic idea of the vehicle traveling control is the same as in the first embodiment. Duplicate explanation with the first embodiment will be properly omitted.

Figure 12:
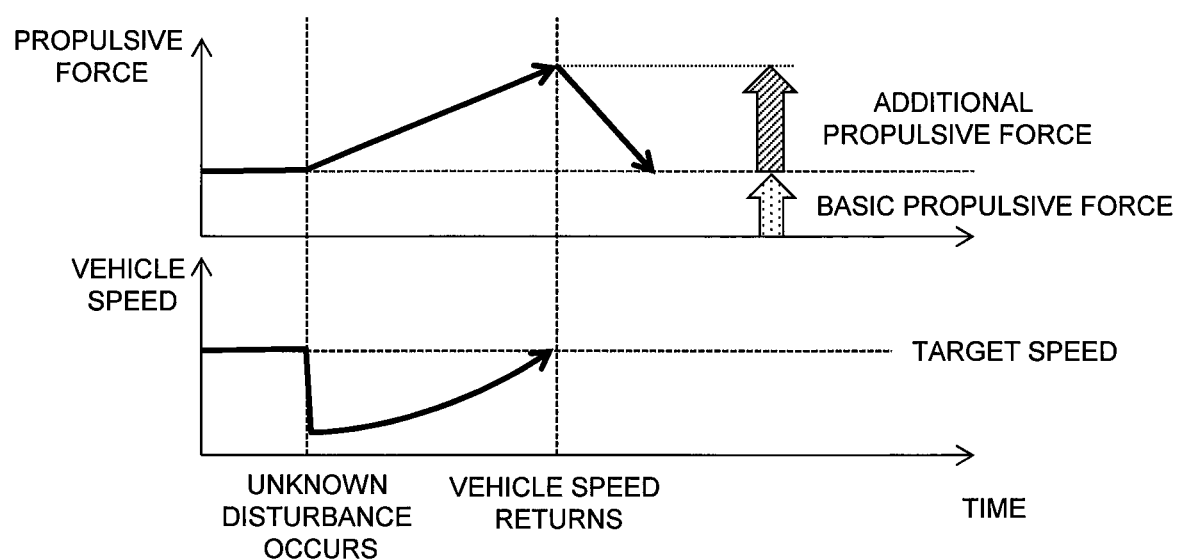
FIG. 12 is a diagram illustrating a temporal change of the propulsive force and a vehicle speed.

FIG. 12 is a diagram illustrating a temporal change of the propulsive force and the vehicle speed. In an example illustrated in the drawing, the additional propulsive force is increased by the additional propulsive force varying process when the decrease amount from the target vehicle speed of the speed of the vehicle becomes larger than a predetermined first threshold. The first threshold in this case is a threshold for determining that the feedback system is brought into a state where the feedback system does not function normally due to decrease in the vehicle speed due to an unknown disturbance. When the decrease amount of the vehicle speed becomes smaller than a predetermined second threshold, the additional propulsive force is decreased by the additional propulsive force varying process. The second threshold in this case is a threshold for determining that the feedback system is brought into a state where the feedback system functions normally by return of the vehicle speed. An operation of decreasing the additional propulsive force according to the remaining distance in the additional propulsive force varying process is the same as in the first embodiment.

In this way, the autonomous parking system 10 of the present embodiment determines that the feedback system is brought into the state where the feedback system does not function normally due to an unknown disturbance even while the vehicle is traveling, and can vary the additional propulsive force. Thereby, exceeding the target position, and an unnatural behavior of the vehicle in the vehicle traveling control can be suppressed.

2-2. Specific Process

Next, a specific process that is executed in the autonomous parking control device 100 of the autonomous parking system 10 of the second embodiment including the aforementioned configuration will be described with reference to a flowchart. The flowchart by the autonomous parking control device 100 is similar to the flowchart illustrated in FIG. 8 described above. However, in the present embodiment, a subroutine which is different from the subroutine illustrated in FIG. 9 described above is executed in step S6 of the flowchart illustrated in FIG. 8.

Figure 13:
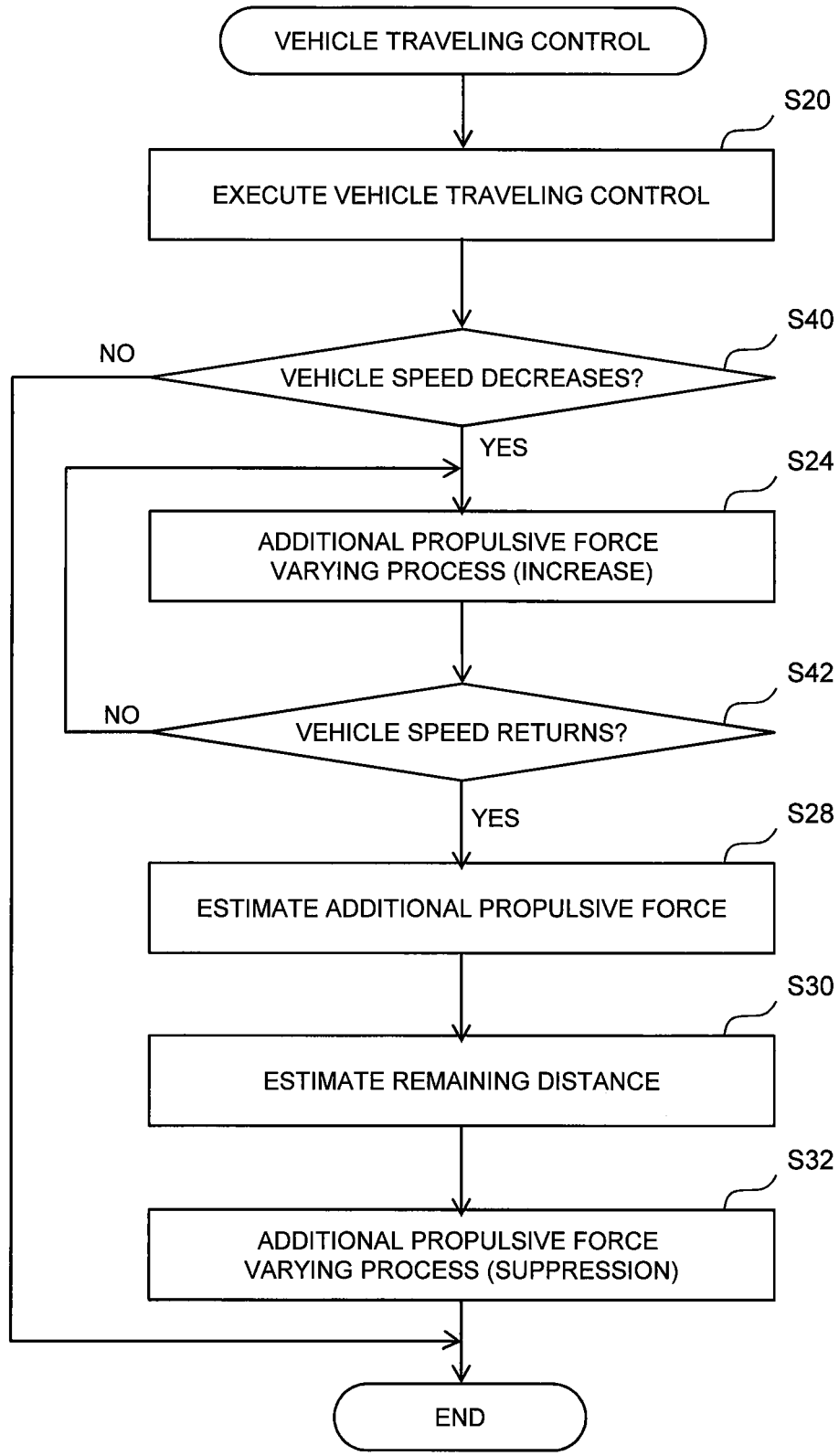
FIG. 13 is a flowchart illustrating a process of vehicle traveling control that is executed in an autonomous parking control device of an autonomous parking system of a second embodiment.

FIG. 13 is a flowchart illustrating a process of the vehicle traveling control that is executed in the autonomous parking control device 100 of the autonomous parking system 10 of the second embodiment. The autonomous parking control section 110 executes a subroutine illustrated in FIG. 13 in the process in step S6 described above.

In step S20 of the routine illustrated in FIG. 13, the autonomous parking control section 110 executes processing similar to the processing in step S20 illustrated in FIG. 9. Subsequently, the process shifts to a next step.

Next, the autonomous parking control section 110 determines whether or not the vehicle speed decreases due to an unknown disturbance factor (step S40). Here, more specifically, the autonomous parking control section 110 determines whether or not the decrease amount of the speed of the vehicle from the target vehicle speed is larger than the predetermined first threshold. When the decrease amount of the vehicle speed is the first threshold or less as a result, the process of the present routine is ended. When the decrease amount of the vehicle speed is larger than the first threshold on the other hand, it is determined that the propulsive force of the vehicle is insufficient due to the unknown disturbance factor, and the process shift to a process in a next step.

In next step S24, the autonomous parking control section 110 executes a process similar to the process in step S24 illustrated in FIG. 9.

In a next step, the autonomous parking control section 110 determines whether or not the vehicle speed is returned. Here, specifically, the autonomous parking control section 110 determines whether or not the decrease amount of the vehicle speed becomes smaller than the predetermined second threshold (step S42). When the decrease amount of the vehicle speed is still the second threshold or more as a result, the process returns to the process in step S24 again. When the decrease amount of the vehicle speed becomes smaller than the second threshold on the other hand, the process shifts to a process in a next step.

In next steps S28, S30 and S32, the autonomous parking control section 110 executes similar processes as the processes in steps S28, S30 and S32 illustrated in FIG. 9. When the process in step S32 is completed, the present subroutine is ended.

As described above, according to the present embodiment, when the vehicle decelerates due to an unknown disturbance during vehicle traveling control, the additional propulsive force is added to the propulsive force. Thereby, the vehicle which is decelerating due to the unknown disturbance can be efficiently accelerated. Further, according to the present embodiment, the degree of suppression of the additional propulsive force after start is set in response to the remaining distance X. Thereby, the additional propulsive force in the case of the remaining distance X being small can be decreased quickly, so that exceeding the target position is suppressed when the unknown disturbance is a transitional disturbance. Further, since the additional propulsive force in the case of the remaining distance X being large is gradually decreased, an unnatural behavior of the vehicle is suppressed when the unknown disturbance factor is a steady-state disturbance. As a result, reliability to the autonomous parking system 10 increases.

What is claimed is:

1. An autonomous parking control device that is mounted on a vehicle,
wherein the vehicle includes
a propulsive force generating device that generates a propulsive force of the vehicle, and
a state detecting sensor that detects an operating state of the vehicle,
wherein the autonomous parking control device is configured to execute
vehicle traveling control that calculates a command value of the propulsive force based on the operating state detected by the state detecting sensor, and moves the vehicle to a target position autonomously by controlling the propulsive force generating device in accordance with the command value, and
an additional command value varying process of adding a predetermined additional command value to the command value when the vehicle stops due to the propulsive force becoming insufficient during the vehicle traveling control, and decreasing or keeping the additional command value by a predetermined degree of suppression, when the vehicle which is stopped starts,
a remaining distance to the target position from a first position is larger than a remaining distance to the target position from a second position, and
the autonomous parking control device is configured to set the degree of suppression to be smaller as compared with a case of executing the additional command value varying process in the second position when executing the additional command value varying process in the first position.

2. The autonomous parking control device according to claim 1,
wherein in the additional command value varying process, the additional command value is configured to continue to increase until the vehicle which is stopped starts.

3. The autonomous parking control device according to claim 1,
wherein in the additional command value varying process, the degree of suppression is configured to be set to be larger as the additional command value at a time of the vehicle which is stopped being started is larger.

4. The autonomous parking control device according to claim 1,
wherein the propulsive force generating device is configured by including
a driving device that generates a driving force in the vehicle, and
a braking device that generates a braking force in the vehicle, and
in the additional command value varying process, the additional command value is configured to be increased by increasing the driving force or decreasing the braking force, and the additional command value is configured to be decreased by decreasing the driving force or increasing the braking force.

5. The autonomous parking control device according to claim 1,
wherein in the vehicle traveling control, the command value is configured to be calculated from an acceleration feedforward term that is a target acceleration of the vehicle, and a feedback term based on a difference between a target value and an actual value of a state quantity of the vehicle in the vehicle traveling control, and
the feedback term is configured by including at least any one of
a speed feedback term that is calculated based on a difference between a target speed of the vehicle and an actual speed obtained from the operating state,
a position feedback term that is calculated based on a difference between a target position of the vehicle and an actual position obtained from the operating state, and
an acceleration feedback term that is calculated based on a difference between a target acceleration of the vehicle and an actual acceleration obtained from the operating state.

6. An autonomous parking control device that is mounted on a vehicle,
wherein the vehicle includes
a propulsive force generating device that generates a propulsive force of the vehicle, and
a state detecting sensor that detects an operating state of the vehicle,
the autonomous parking control device is configured to execute
vehicle traveling control that calculates a command value of the propulsive force based on the operating state detected by the state detecting sensor, and moves the vehicle to a target position autonomously by controlling the propulsive force generating device in accordance with the command value, and
an additional command value varying process of adding a predetermined additional command value to the command value when a decrease amount of an actual speed of the vehicle from a target speed becomes larger than a predetermined first threshold during the vehicle traveling control, and decreasing or keeping the additional command value by a predetermined degree of suppression, when the decrease amount becomes smaller than a predetermined second threshold during addition of the additional command value,
a remaining distance to the target position from a first position is larger than a remaining distance to the target position from a second position, and
the autonomous parking control device is configured to set the degree of suppression to be smaller as compared with a case of executing the additional command value varying process in the second position when executing the additional command value varying process in the first position.

7. An autonomous parking system that is mounted on a vehicle, comprising:
a propulsive force generating device that generates a propulsive force of the vehicle;
a state detecting sensor that detects an operating state of the vehicle; and
an autonomous parking control device,
wherein the autonomous parking control device in configured to execute
vehicle traveling control that calculates a command value of the propulsive force based on the operating state detected by the state detecting sensor, and moves the vehicle to a target position autonomously by controlling the propulsive force generating device in accordance with the command value, and
an additional command value varying process of adding a predetermined additional command value to the command value when the vehicle stops due to the propulsive force being insufficient during the vehicle traveling control, and decreasing or keeping the additional command value by a predetermined degree of suppression, when the vehicle which is stopped is started, a remaining distance to the target position from a first position is larger than a remaining distance to the target position from a second position, and the autonomous parking control device is configured to set the degree of suppression to be smaller as compared with a case of executing the additional command value varying process in the second position when executing the additional command value varying process in the first position.

* * * * *

UNITED STATES PATENT AND TRADEMARK OFFICE
CERTIFICATE OF CORRECTION

| | |
|---|---|
| PATENT NO. | : 11,220,257 B2 |
| APPLICATION NO. | : 16/426154 |
| DATED | : January 11, 2022 |
| INVENTOR(S) | : Kosuke Akatsuka |

It is certified that error appears in the above-identified patent and that said Letters Patent is hereby corrected as shown below:

On the Title Page

Add item (30) with the Foreign Application Priority Data as:
July 25, 2018 (JP).....................JP2018-139157

Signed and Sealed this
Twenty-sixth Day of April, 2022

Katherine Kelly Vidal
*Director of the United States Patent and Trademark Office*